US011404088B1

(12) United States Patent
Oulès et al.

(10) Patent No.: US 11,404,088 B1
(45) Date of Patent: Aug. 2, 2022

(54) COMPOSITE VIDEO GENERATION

(71) Applicant: GoPro, Inc., San Mateo, CA (US)

(72) Inventors: Guillaume Oulès, Bordeaux (FR); Anaïs Oulès, Bordeaux (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/244,895

(22) Filed: Apr. 29, 2021

(51) Int. Cl.
*G11B 27/036* (2006.01)
*G06T 7/70* (2017.01)
*G06T 7/194* (2017.01)
*H04N 5/265* (2006.01)
*G06V 10/98* (2022.01)
*G06V 20/40* (2022.01)
*G06V 40/10* (2022.01)
*G06V 40/16* (2022.01)

(52) U.S. Cl.
CPC ............ *G11B 27/036* (2013.01); *G06T 7/194* (2017.01); *G06T 7/70* (2017.01); *G06V 10/98* (2022.01); *G06V 20/40* (2022.01); *G06V 40/103* (2022.01); *G06V 40/161* (2022.01); *H04N 5/265* (2013.01); *G06T 2207/10016* (2013.01); *G06T 2207/20221* (2013.01); *G06T 2207/30201* (2013.01)

(58) Field of Classification Search
None
See application file for complete search history.

(56) References Cited

U.S. PATENT DOCUMENTS

2010/0281375 A1* 11/2010 Pendergast ............. G11B 27/34 715/723
2016/0110612 A1* 4/2016 Sabripour ................ G06F 16/73 382/103
2020/0134313 A1* 4/2020 Endoh .................... G06V 10/25

* cited by examiner

*Primary Examiner* — Eileen M Adams
(74) *Attorney, Agent, or Firm* — Esplin & Associates, PC

(57) ABSTRACT

Locations in which a person is depicted within video frames may be determined to identify portions of the video frames to be included in a composite video. A background image not including any depiction of the person may be generated, and the identified portions of the video frames may be inserted into the background image to generate the composite video.

20 Claims, 7 Drawing Sheets

System 10

300

410

420

500

COMPOSITE VIDEO GENERATION

FIELD

This disclosure relates to generating composite videos.

BACKGROUND

A user may wish to create a composite video that includes multiple depictions of a particular thing. For example, a user may wish to create a composite video that includes multiple depictions of a person. Manually inserting multiple depictions of a thing and manually synchronizing such depictions within a video may be difficult and time-consuming.

SUMMARY

This disclosure relates to generating composite videos. Video information and/or other information may be obtained. The video information may define a video having a progress length. The video may include video frames. The video frames may include depiction of a person that moves during the progress length of the video. The video frames may include the depiction of the person at different locations within the video frames. The video frames may include a first video frame, a second video frame, and/or other video frames. The first video frame may include the depiction of the person at a first location and the second video frame may include the depiction of the person at a second location different from the first location. The different locations of the depiction of the person within the video frames may be determined.

Different portions of the video frames to be included in a composite video may be determined based on the different locations of the depiction of the person within the video frames and/or other information. A background image may be generated from the video frames based on the different locations of the depiction of the person within the video frames and/or other information. The background image may not include the depiction of the person. The composite video may be generated based on the different portions of the video frames, the background image, and/or other information. The composite video may include composite video frames. The composite video frames may include multiple depictions of the person.

A system that generates composite videos may include one or more electronic storage, processor, and/or other components. The electronic storage may store video information, information relating to video, information relating to visual content, information relating to depiction of a person, information relating to locations of the person depicted within the visual content, information relating background image, information relating to composite video, and/or other information.

The processor(s) may be configured by machine-readable instructions. Executing the machine-readable instructions may cause the processor(s) to facilitate generating composite videos. The machine-readable instructions may include one or more computer program components. The computer program components may include one or more of a video information component, a location component, a portion component, a background component, a composite component, and/or other computer program components.

The video information component may be configured to obtain video information and/or other information. The video information may define a video having a progress length. The video may include video frames. The video frames may include depiction of a person that moves during the progress length of the video. The video frames may include the depiction of the person at different locations within the video frames. The video frames may include a first video frame, a second video frame, and/or other video frames. The first video frame may include the depiction of the person at a first location, and the second video frame may include the depiction of the person at a second location different from the first location.

The location component may be configured to determine the different locations of the depiction of the person within the video frames. In some implementations, the different locations of the depiction of the person within the video frames may be determined based on body detection. In some implementations, the different locations of the depiction of the person within the video frames may be determined based on face detection responsive to failure of the body detection.

The portion component may be configured to determine different portions of the video frames to be included in a composite video. The different portions of the video frames to be included in the composite video may be determined based on the different locations of the depiction of the person within the video frames and/or other information.

In some implementations, determination of the different portions of the video frames to be included in the composite video may include determination of different locations of a mask for the video frames. The different locations of a mask for the video frames may be determined based on the different locations of the depiction of the person within the video frames. The different locations of the mask for the video frames may be determined such that the depiction of the person within the video frames is included within the mask.

In some implementations, determination of the different locations of the mask may include determination of different placements and/or different sizes of the mask. In some implementations, the different placements and/or the different sizes of the mask may be determined to prevent overlap of the mask for merging of multiple ones of the depiction of the person included within the multiple ones of the video frames and included within the mask into individual composite video frames.

The background component may be configured to generate a background image from the video frames. The background image may be generated based on the different locations of the depiction of the person within the video frames. The background image may not include the depiction of the person.

In some implementations, the background image may be generated based on merging of two or more of the video frames. The two or more of the video frames may be selected for merging based on the different locations of the depiction of the person within the video frames and/or other information.

In some implementations, multiple ones of the video frames may be selected for merging, into the individual composite video frames, of the multiple ones of the depiction of the person included within the multiple ones of the video frames and included within the mask based on matching of audio associated with the video frames and/or other information.

In some implementations, multiple ones of the video frames may be selected for the merging, into the individual composite video frames, of the multiple ones of the depiction of the person included within the multiple ones of the video frames and included within the mask based on matching of poses of the person depicted within the video frames and/or other information.

The composite component may be configured to generate the composite video based on the different portions of the video frames, the background image, and/or other information. The composite video may include composite video frames. The composite video frames may include multiple depictions of the person.

In some implementations, the composite video frames may include the multiple depictions of the person based on merging, into individual composite video frames, of multiple ones of the depiction of the person included within multiple ones of the video frames and included within the mask.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
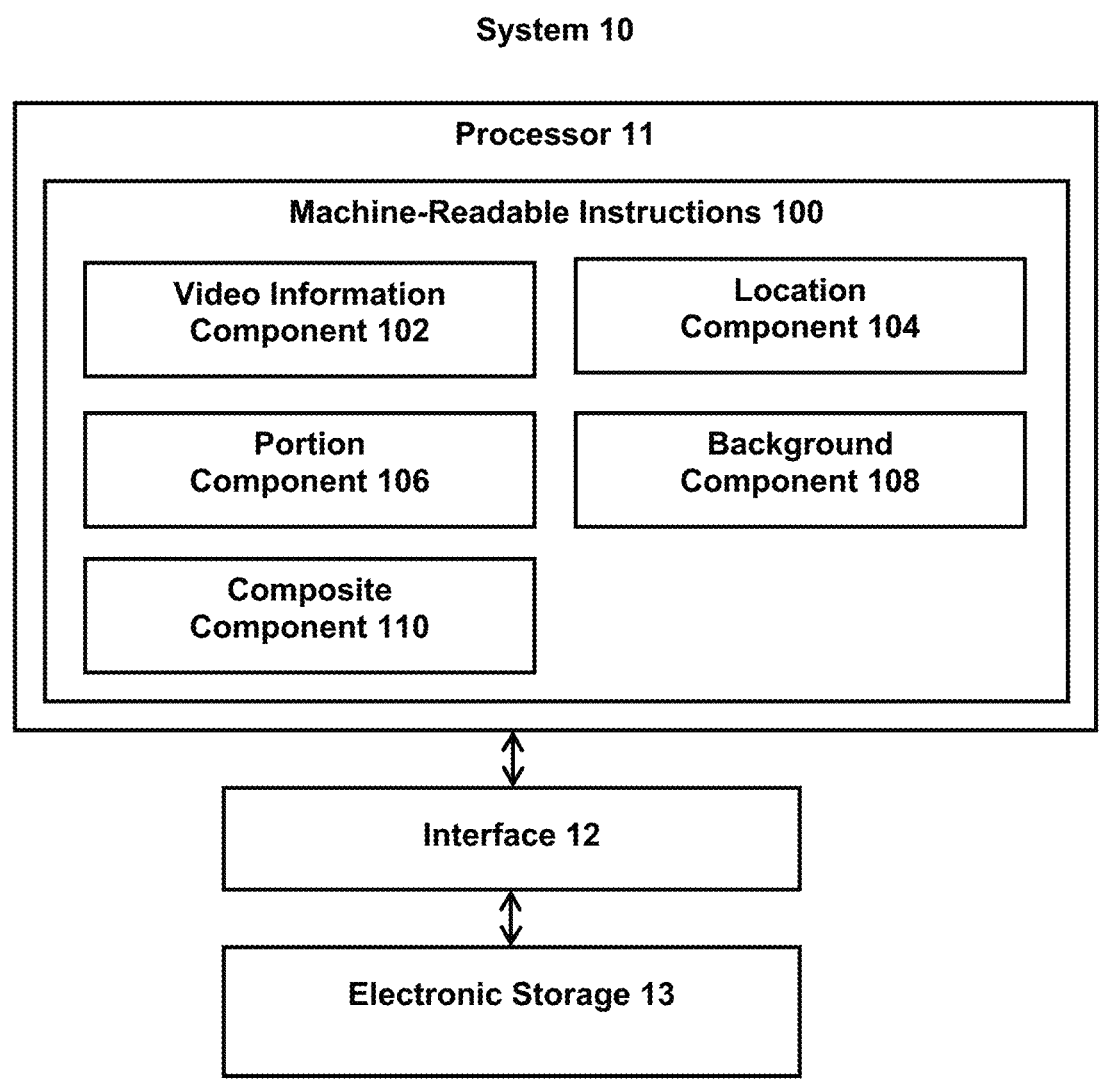
FIG. 1 illustrates a system that generates composite videos.

FIG. 1 illustrates a system 10 that generates composite videos. The system 10 may include one or more of a processor 11, an interface 12 (e.g., bus, wireless interface), an electronic storage 13, and/or other components. Video information and/or other information may be obtained by the processor 11. The video information may define a video having a progress length. The video may include video frames. The video frames may include depiction of a person that moves during the progress length of the video. The video frames may include the depiction of the person at different locations within the video frames. The video frames may include a first video frame, a second video frame, and/or other video frames. The first video frame may include the depiction of the person at a first location and the second video frame may include the depiction of the person at a second location different from the first location. The different locations of the depiction of the person within the video frames may be determined by the processor 11.

Different portions of the video frames to be included in a composite video may be determined by the processor 11 based on the different locations of the depiction of the person within the video frames and/or other information. A background image may be generated from the video frames by the processor 11 based on the different locations of the depiction of the person within the video frames and/or other information. The background image may not include the depiction of the person. The composite video may be generated by the processor 11 based on the different portions of the video frames, the background image, and/or other information. The composite video may include composite video frames. The composite video frames may include multiple depictions of the person.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to video, information relating to visual content, information relating to depiction of a person, information relating to locations of the person depicted within the visual content, information relating background image, information relating to composite video, and/or other information.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files. Audio information may be stored with and/or separate from the video information. In some implementations, audio information may be stored within one or more audio tracks of a video.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate generating composite videos. The machine-readable instructions 100 may include one or more computer program components. The machine-readable instructions 100 may include one or more of a video information component 102, a location component 104, a portion component 106, a background component 108, a composite component 110, and/or other computer program components.

The video information component 102 may be configured to obtain video information and/or other information. Obtaining video information may include one or more of accessing, acquiring, analyzing, determining, examining, identifying, loading, locating, opening, receiving, retrieving, reviewing, selecting, storing, and/or otherwise obtaining the video information. The video information component 102 may obtain video information from one or more locations. For example, the video information component 102 may obtain video information from a storage location, such as the electronic storage 13, electronic storage of information and/or signals generated by one or more sensors, electronic storage of a device accessible via a network, and/or other locations. The video information component 102 may obtain video information from one or more hardware components (e.g., an image sensor, a sound sensor) and/or one or more software components (e.g., software running on a computing device).

In some implementations, the video information component 102 may obtain video information based on user interaction with a user interface/application (e.g., video editing application, video player application), and/or other information. For example, a user interface/application may provide option(s) for a user to generate a composite video. The video information defining a video may be obtained based on the user's selection of the video through the user interface/video application. Other selections of video for retrieval of video information are contemplated.

The video information may define one or more videos. A video may include video content (e.g., visual content, audio content) having a progress length. A video may include video frames. The visual content of the video included in the video frames may have a field of view. The field of view of the visual content may refer to a portion of a scene that was observed by one or more image capture devices in capturing the visual content. The field of view may refer to the extent (e.g., angle, size) of the scene that is captured within the visual content.

The video information may define a video by including information that defines one or more content, qualities, attributes, features, and/or other aspects of the video/video content. For example, the video information may define video content by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. The video information may include information that makes up and/or is used to determine audio content of the video. Other types of video information are contemplated.

In some implementations, the video content may include spherical video content. The field of view of the visual content of spherical video content may include a spherical field of view. Spherical field of view may include full spherical field of view (360 degrees of capture) or partial spherical field of view (less than 360 degrees of capture). The visual content may be viewable from a point of view as the function of progress through the progress length. Spherical video content may include and/or may be associated with spatial sounds.

Video information may be stored within a single file or multiple files. For example, video information defining video content may be stored within a video file, multiple video files, a combination of different files (e.g., a visual file and an audio file), and/or other files. Video information may be stored in one or more formats or containers. A format may refer to one or more ways in which the information defining a video is arranged/laid out (e.g., file format). A container may refer to one or more ways in which information defining a video is arranged/laid out in association with other information (e.g., wrapper format).

The video frames may include depiction of one or more things. The video frames may include depiction of a living thing and/or a non-living thing. The video frames may include depiction of the entirety of a thing or one or more parts of the thing. A thing depicted within the video frames include objects, parts of objects, people, parts of people, activity, emotion, scenery, and/or other thing.

For example, the video frames may include depiction of a person (e.g., the person's body). The video frames of a video may be captured by an image capture device that includes one or more persons within the field of view of the image capture device.

A thing (e.g., person) captured within the video frames may move during capture of the video frames (during capture duration). The depiction of the thing may change between the video frames based on the movement of the thing during capture of the video frames. That is, the video frames may include depiction of the thing that moves during the progress length of the video.

The movement of the thing may result in the thing being depicted at different locations within the video frames. Location of a depiction within a video frame may refer to spatial location (pixel location) of the depiction within the video frame. Location of a depiction within a video frame may refer to one or more of position, rotation, and/or size of the thing depicted within the video frame. For example, the video frames may include the depiction of a person at different locations (pixel locations) within the video frames based on the person moving during the capture of the video frames. For example, a stationary image capture device may have captured video frames of a person running across the field of view of the image capture device (e.g., from right to left). The video frames may include a first video frame, a second video frame, and/or other video frames. The first video frame may include the depiction of the person at one location (e.g., right side of the video frame), and the second video frame may include the depiction of the person at a different location (e.g., left side of the video frame).

A thing (e.g., person) captured within video frames of different videos may stay within a distinct region of the video frames of the videos. A region of a video frame may refer to a spatial area within the video frame. For example, a video frame may be divided into multiple regions, such as top, left, side, bottom, right, center, corners, and/or other regions. Different videos may include depiction of the thing within a distinct region of the video frames.

For example, multiple videos may include depiction of a person at different locations. The video frames of different videos may include the depiction of the person at different locations based on different framing of the person within the videos. For example, a stationary image capture device may have captured video frames of different videos that include a view of a scene. The different videos may have been captured while the person was positioned at different positions within the scene. For example, video frames of a first video may include depiction of a person in a left region (e.g., left third) of the video frames, video frames of a second video may include depiction of the person in a center region (e.g., center third) of the video frames of the video frame, and video frames of a third video may include depiction of the person in a right region (e.g., right third) of the video frames.

The location component 104 may be configured to determine the locations of the depiction of the thing(s) within the video frames. For example, the location component 104 may be configured to determine the different locations of the depiction of a person within the video frames. Location determination of other things within the video frames is contemplated. The location component 104 may be configured to determine the different locations of the depiction of thing(s) within the video frames of a single video or within the video frames of multiple videos. Determining location of a depiction of a thing within a video frame may include ascertaining, detecting, establishing, finding, identifying, obtaining, and/or otherwise determining the location of the depiction of the thing within the video frame.

The location of the depiction of thing(s) within the video frames of a video may be determined as the function of progress through the progress length of the video (e.g., determining the location of the depiction of a person in different video frames of the video). Determining location of the depiction of thing(s) within the video frames of a video may include determining changes in the location of the depiction of thing(s) as the function of progress through the progress length of the video (e.g., determining change in location in different video frames of the video). That is, the location of the depiction of the thing(s) may be tracked throughout the progress length of the video.

The location of the depiction of thing(s) within the video frames of multiple videos may be determined to compare locations of the depiction within multiple videos. Determining location of the depiction of thing(s) within the video frames of multiple videos may include determining in which regions of the video frames the depiction appears within the different videos.

The location of the depiction of thing(s) within the video frames may be determined based on user selection, analysis of the video frames, and/or other information. User selection of the location may refer to user input that identifies/designates the particular location of the depiction within the visual content. For example, a user may interact with a user interface to identify one or more of position, rotation, and/or size of a person depicted within the video frames. Analysis of video frames may include analysis of the content of the video frames, such as analysis of the arrangement of pixels, characteristics of pixels, values of pixels, and/or other aspects of pixels of the video frames. Analysis of video frames may include use of computer vision and/or other object detection/recognition techniques to determine the location of the depiction of thing(s) within the video frames. For example, analysis of the content of the video frames may be used to determine one or more of position, position, and/or size of a person depicted within the video frames.

In some implementations, the different locations of the depiction of the person within the video frames may be determined based on body detection. That is, the location of the video frames in which the person is depicted may be determined based on body detection (detection of a person's body). In some implementations, the different locations of the depiction of the person within the video frames may be determined based on face detection responsive to failure of the body detection. Based on body detection failing to detect a body in a video frame (e.g., unable to recognize any body within the video frame, unable to recognize any body with a threshold confidence within the video frame), the location component 104 may instead use face detection (detection of a person's face) to determine the location in which the person is depicted within the video frame. In some implementations, the likely location of the rest of the person's body may be determined based on the location of the face, attributes of the face (e.g., rotation/tilt of the face), and/or other information.

In some implementations, the location of the depiction of a thing within a particular video frame may be determined further based on the location of the depiction of the thing within one or more prior video frames and/or one or more subsequent video frames. The location determined within preceding and/or following video frames may be used limit the location determination within the video frame. Other determination of the location of the thing(s) depicted within the video frames is contemplated.

The portion component 106 may be configured to determine portions of the video frames to be included in a composite video. Determining a portion of a video frame to be included in a composite video may include ascertaining, detecting, establishing, finding, identifying, obtaining, and/or otherwise determining the portion of the video frame to be included in the composite video. One or more portions of the video frames may be determined within a single video (e.g., a single video clip). One or more portions of the video frames may be determined within multiple videos (e.g., multiple video clips).

A composite video may refer to a video in which one or more of the video frames are made from combination of multiple images/video frames. A composite video may refer to a video in which one or more of the video frames are composite images. A portion of a video frame may refer to a spatial part of the video frame. The different portions of the video frames to be included in the composite video may be determined based on the different locations of the depiction of thing(s) within the video frames and/or other information. That is, which portions of the video frames are included in the composite video may be determined based on where the thing(s) are depicted within the video frames. For example, the portions of the video frames to be included in the composite video may be determined based on where a person is depicted within the video frames.

A portion of a video frame to be included in a composite video may refer to a spatial part (e.g., pixel group) to be include in the composite video. A portion of a video frame to be included in a composite video may include the depiction of the thing(s). Different portions of video frames to be included in the composite video may be determined based on different locations of depiction of things within the video frames and/or other information. For example, different portions of video frames to be included in the composite video may be determined based on different locations of depiction of the person within the video frames and/or other information.

The portions of the video frames to be included in the composite video may include a moving portion, a non-moving portion, and/or other portion. A moving portion may refer to a portion of the video frame that moves/changes between video frames. A non-moving portion may refer to a portion of the video frame that does not move/change between video frames.

Determining a moving portion of video frames for inclusion in the composite video may refer to determining different portions of video frames for inclusion in the composite video. For example, the video may include a first video frame and a second video frame, and determining a moving portion of the video frames for inclusion in the composite video may include determining different spatial parts of the first video frame and the second video frame for inclusion in the composite video.

In some implementations, the portion component 106 may determine a moving portion for inclusion in the composite video based on the depiction of the thing(s) moving within a single video. Based on the location component 104 determining that video frames of a single video include the depiction of the thing(s) changing within the video, the portion component 106 may determine a moving portion of the video frames of the single video for inclusion in the composite video. For example, a stationary image capture device may have captured video frames of a person running across the field of view of the image capture device (e.g., from right to left). Based on detecting that this single video includes the depiction of the person that moves from one region of the video frames to another region of the video frames (e.g., from right region to left region), a moving portion of the video frames of the single video may be determined for inclusion in the composite video. The moving portion of the video frames may include the depiction of the person.

Determining a non-moving portion of video frames for inclusion in the composite video may refer to determining same portion of video frames of a video for inclusion in the composite video. For example, there may be multiple videos, and determining a non-moving portion of the video frames for inclusion in the composite video may include determining one spatial part of individual videos for inclusion in the composite video. The spatial part of individual videos that are determined for inclusion may be different from each other. For example, there may be two videos, and determining a non-moving portion of the video frames may include determining a first non-moving portion of the video frames of the first video, and determining a second non-moving portion of the video frames of the second video.

In some implementations, the portion component 106 may determine a non-moving portion of individual videos for inclusion in the composite video based on the depiction of the thing(s) staying within a distinct region of the video frames of the individual videos. Based on the location component 104 determining that video frames of individual videos include the depiction of the thing(s) in a d distinct region of the video frames, the portion component 106 may determine a non-moving portion of the video frames of individual videos for inclusion in the composite video. For example, multiple videos may include depiction of a person at different locations. The video frames of different videos may include the depiction of the person at different locations based on different framing of the person within the videos. For instance, a first video may include the depiction of the person in the left region of the video frames while a second video may include the depiction of the person in the right region of the video frames. Based on detecting that multiple videos include the depiction of the person in distinct regions of the video frames, a non-moving portion of the video frames of individual videos may be determined for inclusion in the video. The non-moving portion of the video frames of individual videos may include the depiction of the person.

In some implementations, determination of the portions of the video frames to be included in the composite video may include determination of locations of a mask for the video frames. Different locations of a mask for the video frames may be determined based on different locations of the depiction of the thing(s) within the video frames. The different locations of the mask for the video frames may be determined such that the depiction of the thing(s) within the video frames is included within the mask. For example, different locations of a mask for the video frames may be determined based on different locations of the depiction of a person within the video frames, with the mask locations being determined to include the depiction of the person within the mask. The locations of the mask may be determined to be the same as/to overlap with the portions of the video frames to be included in the composite video. That portions of the video frames that are included (identified) by the mask may be the portions of the video frames to be included in the composite video.

Figure 3:
FIG. 3 illustrates an example video frame.
Figure 4A:
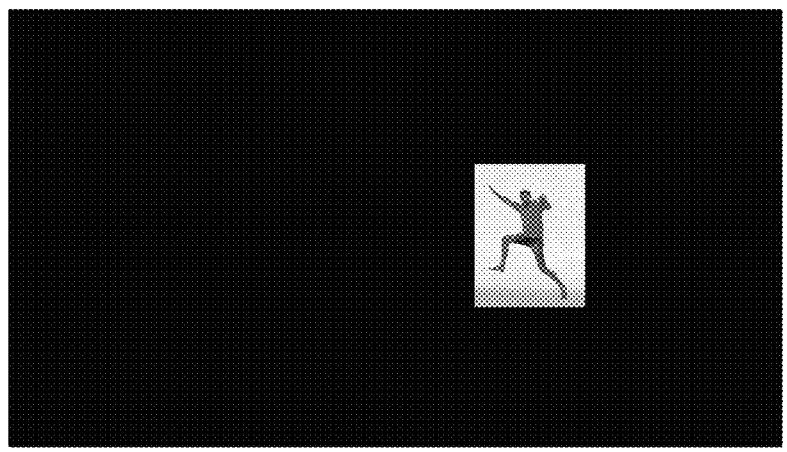
FIG. 4A illustrates example masking of a person depicted within a video frame.
Figure 4B:
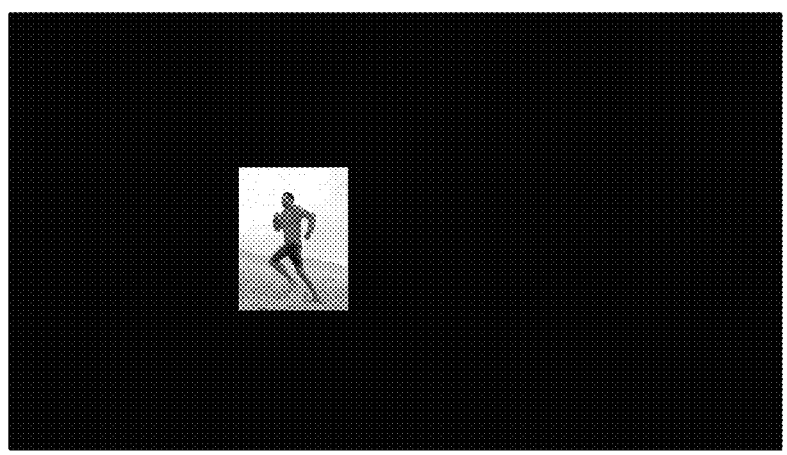
FIG. 4B illustrates example masking of a person depicted within a video frame.
Figure 5:
FIG. 5 illustrates an example composite video frame including multiple depictions of a person.

The mask may be a rough mask. That is, the mask may not be a precise mask that traces the outer boundaries of the thing(s). Rather, the mask may be a mask of a general shape (e.g., square, rectangle, circle, oval) that encloses the depiction of thing(s). For example, FIG. 3 illustrates a video frame 300. The video frame 300 may include a depiction of a person jumping in the air. The video frame 300 may be a video frame of a video that include the depiction of the person moving right to left. Precisely determining the outline of the person for inclusion in the composite video may be computationally expensive (e.g., require high processing power and/or time). Rather than using a precise mask, a rough mask that includes the depiction of the person may be used, such as shown in FIG. 4A. FIG. 4A may show a video frame 410 with a rough mask in the shape of a rectangle. The mask may include/identify a rectangular area of the video frame 410 for inclusion in the composite video. The mask may move with the depiction of the person over the video. For example, FIG. 4B shows a later/subsequent video frame 420 with a rough mask. The mask may include/identify a different area of the video frame 420. The area identified by the mask may include the depiction of the person. FIG. 5 illustrates an example composite video frame 500 including multiple depictions of a person. The composite video frame 500 may be generated by including the depiction of the person included within/identified by the mask in the video frame 410 and the depiction of the person included within/identified by the mask in the video frame 420. For example, FIG. 5 illustrates a compositive video frame 500. The compositive video frame 500 may include the depiction of the person from the video frame 410 and the depiction of the person from the video frame 420.

As another example, different videos may include depiction of a person in distinct regions. For example, a first video may include depiction of a person in a left region of the video frames while a second video may include depiction of a person in a right region of the video frames. The mask for the first video may include/identity the left region of the video frames for inclusion in the composite video while the mask for the second video may include/identify the right region of the video frames for inclusion in the composite video. Usage of rough masks may allow for low cost (e.g., require low processing power and/or time) generation of composite videos.

In some implementations, determination of the different locations of the mask may include determination of different placements and/or different sizes of the mask. For example, mask may include/identify areas of different locations and/or different sizes of the video frames. The different placements and/or the different sizes of the mask may be determined to prevent overlap of the mask in generation of the composite video. The generation of the composite video may include merging of depiction of thing(s) within the video frames that are included within/identified by the mask. The different placements and/or the different sizes of the mask may be determined to prevent overlap of the mask merging, into individual composite video frames, of multiple depiction of the thing(s) e.g., (person) included within multiple video frames and included within the mask.

Figure 6A:
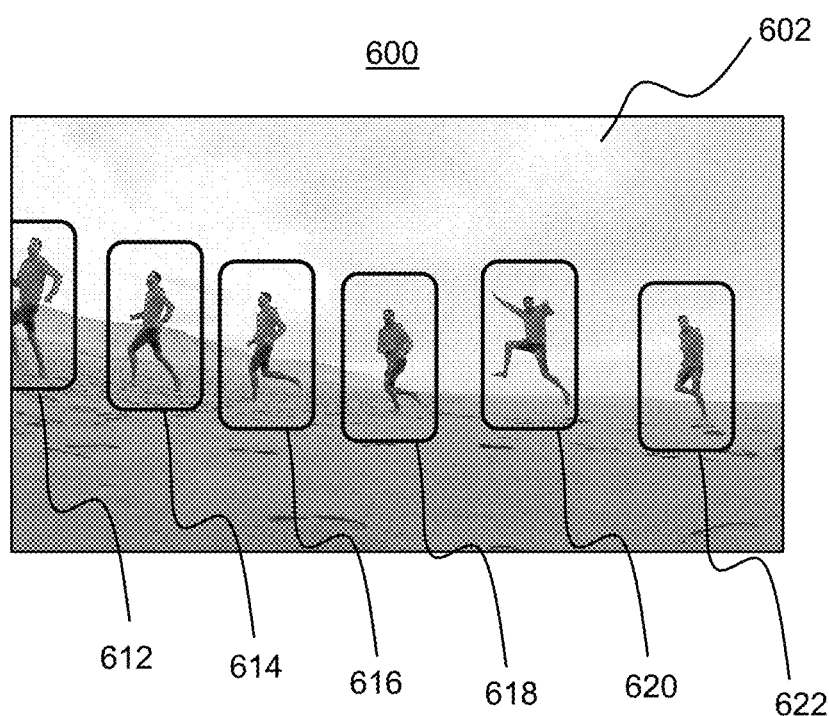
FIG. 6A illustrates example mask locations to generate a composite video frame.

For example, placement and/or size of a moving mask for a single video may be determined so that the moving mask for different video frames to be used in generate composite video frames do not overlap. For example, FIG. 6A illustrates example mask locations 612, 614, 616, 618, 620, 622 to generate a composite video frame 600. The placement and size of the mask locations 612, 614, 616, 618, 620, 622 for six different video frames may be determined so that they do not overlap. Such placement and size of the mask location results in the multiple depictions of the person not overlapping within the composite video frame 600.

Figure 7A:
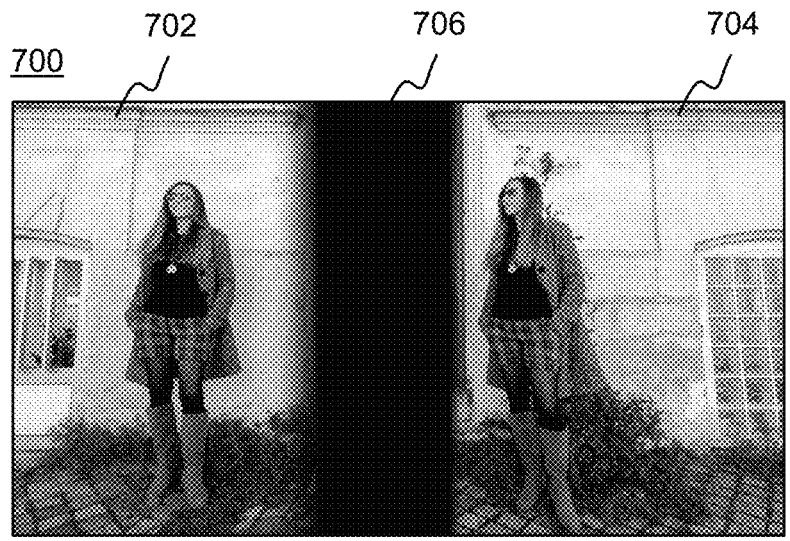
FIG. 7A illustrates example masking of a person depicted within video frames.
Figure 7B:
FIG. 7B illustrates an example composite video frame including multiple depictions of a person.

As another example, placement and/or size of a non-moving mask for multiple videos may be determined so that a non-moving mask for one video does not overlap with a non-moving mask for another video. For example, FIG. 7A illustrates example mask locations 702, 704, 706 to generate a composite video frame 700. In FIG. 7A, the composite video frame 700 includes two depictions of a person from two different video frames. The placement and size of the mask locations 702, 704, 706 may be determined so that they do not overlap. The mask in the mask location 702 may include a non-moving mask that identifies/includes a left region of the corresponding video frame. The mask in the mask location 704 may include a non-moving mask that identifies/includes a right region of the corresponding video frame. The mask in the mask location 706 may include a non-moving mask that identifies/includes a center region of the corresponding video frame. Such placement and size of the mask location results in the multiple depictions of the person not overlapping within the composite video frame 700. FIG. 7B illustrates a composite video frame 750 that includes three depictions of a person from three different video frames. The composite video frame 750 may be generated by using the mask locations 702, 704, 706 shown in FIG. 7A.

In some implementations, the portion component 106 may be configured to determine video frames of the video(s) that will be used to generate individual composite video frames of the composite video. Determining video frames of the video(s) that will be used to generate individual composite video frames may include ascertaining, detecting, establishing, finding, identifying, obtaining, and/or otherwise determining the video frames of the video(s) that will be used to generate the individual composite video frames. An individual composite video frame of the composite video may include multiple depictions of the thing(s) from multiple video frames of a single video or multiple videos. The portion component 106 may be configured to determine video frames of a single video or multiple videos that will be used to generate individual composite video frames of the composite video.

For a single video, the portion component 106 may be configured to determine which of the video frames of the single video will be selected for merging into a single composite video frame based on size of the moving portion to be included in the composite video frame (size of the moving mask used), the speed with which the moving portion moves within/across the video frames, and/or other information. The video frames may be selected for merging of the depiction of thing(s) so that the moving portion/moving mask of the selected video frames do not overlap. The video frames may be selected for merging of the depiction of thing(s) so that the moving portion/moving mask of the selected video frames are spaced apart by a particular distance/at least a certain distance.

Figure 6B:
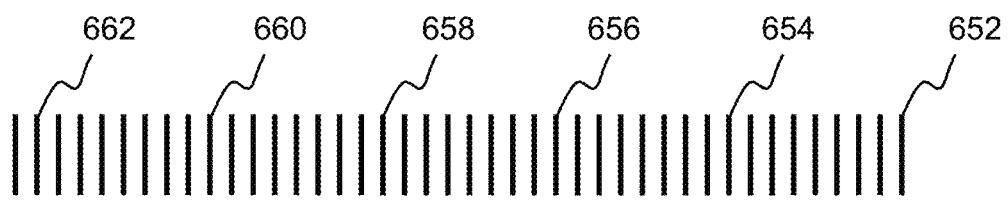
FIG. 6B illustrates an example selection of video frames to generate a composite video frame.
Figure 6C:
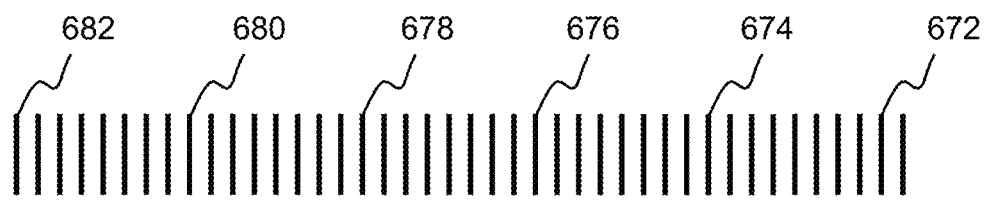
FIG. 6C illustrates an example selection of video frames to generate a composite video frame.

For example, FIG. 6B may show video frames of a video. Of these video frames, video frames 652, 654, 656, 658, 660, 662 may be selected for use in generating the composite video frame 600 (shown in FIG. 6A). The video frame 652 may include the depiction of the person with the mask location 612, the video frame 654 may include the depiction of the person with the mask location 614, the video frame 656 may include the depiction of the person with the mask location 616, the video frame 658 may include the depiction of the person with the mask location 618, the video frame 660 may include the depiction of the person with the mask location 620, the and the video frame 652 may include the depiction of the person with the mask location 622. To generate the next composite video frame, subsequent video frames spaced apart by the same amount may be selected for merging of the depictions. For example, as shown in FIG. 6C, video frames 672, 674, 676, 678, 680, 682 may be selected for use in generating the next composite video frame.

In some implementations, multiple frames may be selected for merging, into the individual composite video frames, of the multiple depictions of the thing(s) e.g., person) included within the multiple video frames and included within the mask based on matching of audio associated with the video frames and/or other information. For example, audio associated with the video frames of multiple videos/multiple parts of a single video may be analyzed (e.g., using cross-correlation audio analysis, convolution analysis) to synchronize the multiple videos/multiple parts to each other. The synchronized video frames may be selected for merging of the depictions included within these video frames. Such selection of video frames may result in a compositive video in which content depicted within the compositive video frames are synchronized to the same sound (e.g., same song, rhythm, music, instruction).

In some implementations, multiple video frames may be selected for the merging, into the individual composite video frames, of the multiple depictions of the person included within the multiple video frames and included within the mask based on matching of poses of the person depicted within the video frames and/or other information. For example, content of the video frames may be analyzed to determine/estimate pose of the person within the video frames of multiple videos/multiple parts of a single video. The matching pose of the person may be used to synchronize the video frames of the multiple videos/multiple parts to each other. Matching of two poses of a person may include the two poses being the same, the two poses being similar (e.g., poses not deviating from each other by more than a threshold amount), two poses being complementary to each other (e.g., opposing movement), and/or other matching o the two poses. The synchronized video frames may be selected for merging of the depictions included within these video frames. Such selection of video frames may result in a compositive video in which content depicted within the composite video frames are synchronized by pose (e.g., same/complimentary movement, pattern, gesture).

The background component 108 may be configured to generate a background image from the video frames. A background image may refer to an image to be used as a background of a composite video frame. The background image may provide a fixed background for multiple compositive video frames. The background image may not include any depiction of the thing(s) to be included within the composite video frames. The background image may provide visual content without any depiction of the thing(s) that are to be multiplied in the composite video frames. For example, to generate a composite video that include multiple depictions of a person, the background image may be generated to not include any depiction of the person. Generation of the background image (fixed background) may allow for composite video frames to be generated without requiring precise segmentation (e.g., manual masking, pixel-level segmentation) of the depiction of the thing(s) from the background.

In some implementations, the background image may be generated based on merging of two or more video frames. The two or more of the video frames may be selected for merging based on the different locations of the depiction of the thing(s) within the video frames and/or other information. The two or more video frames may be selected based on the depiction of the thing(s) being located at different places within the video frames. The background image may be generated by merging the depiction of the background from the selected video frames. Depiction of the background missing in one video frame may be obtained from another video frame in generation of the background image. For example, a first video frame may include the depiction of a person in the right side while a second video frame may include the direction of the person in the left side. The background image may be generated by merging the left side of the first video frame with the right side of the second video frame.

In some implementations, different video frames selected for generation of the background image may have movement in the background. For example, the background of the video frames may include environment, such as moving clouds in the sky. In some implementations, the differences in background among different background images may be taken into account in generating the background image. For example, the background depiction (e.g., the video frame minus the depiction of the thing(s)) in the selected video frames may be averaged together to generate the background image. As another example, Gaussian mixture of the background depiction within the selected video frames may be used to generate a composite background video frames. Other generation of the background image is contemplated.

The composite component 110 may be configured to generate the composite video based on the portions of the video frames determined by the portion component 106 for inclusion in the composite video, the background image, and/or other information. The composite video may include composite video frames. Some or all of the composite video frames may include multiple depictions of the thing(s). For example, some or all of the compositive video frames may include multiple depictions of the person depiction within the video(s). In some implementations, the composite video may be stored in memory for later presentation. In some implementations, the composite video may be presented on one or more displays.

In some implementations, the composite video frames may include the multiple depictions of the thing(s) (e.g., person) based on merging, into individual composite video frames, of multiple depiction of the thing(s) included within multiple video frames and included within/(e.g., identified by) the mask. The compositive video frames may be generated by inserting into the same background image (generated by the background component 108) the depictions of the thing(s) extracted from multiple video frames. The depictions of thing(s) from multiple video frames may be combined with the static background image by using one or more blending techniques, such alpha blending and/or multi-band blending. For instance, the edges of the masks may be blurred when merging the depiction of the thing(s) with the background image.

In some implementations, one or more of the depiction of thing(s) may be inserted into the composite video frames for appearance/disappearance in the composite video with one or more events of the compositive video. For example, one or more depictions of a person may be inserted into the composite video frames so that the depiction(s) of the person appears and/or disappeared to the beat of the music of the composite video. As another example, the composite video may include multiple depictions of a person singing (originally captured in different videos or at different parts of a single video), and the multiple depictions of the person may be synchronized to the song. The multiple depictions of the person may be present through the entirety of the composite video or multiple depiction of the person may appear/disappear (to be replaced with background image) based on one or more characteristics of the song. In some implementations, the appearance/disappearance of the depiction of thing(s) may be set by a user. For example, a user may be provided with options to determine when a particular depiction of the thing(s) will appear and/or disappear within the composite video. Other generation of the compositive video is contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
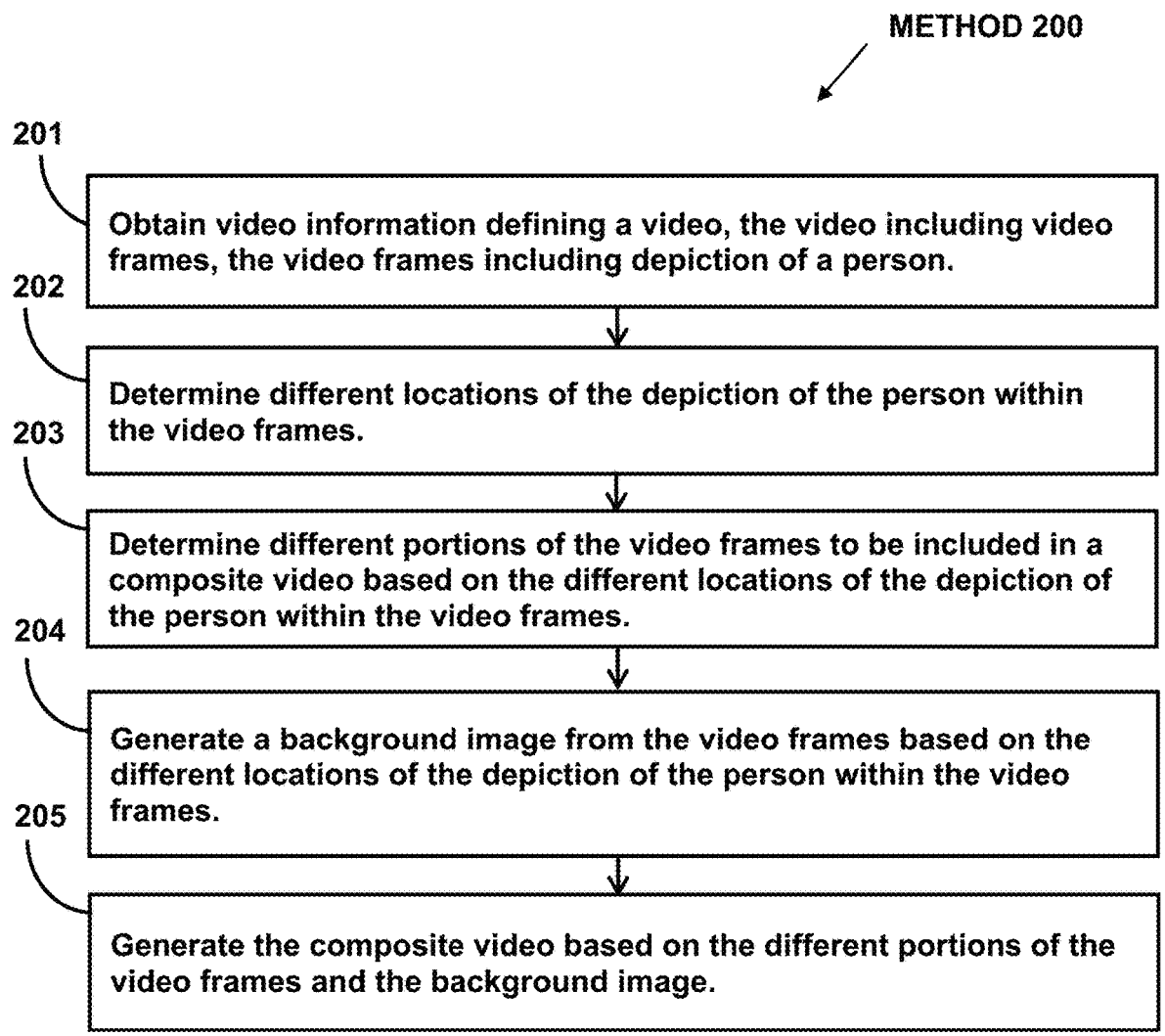
FIG. 2 illustrates a method for generating composite videos.

FIG. 2 illustrates method 200 for generating composite videos. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, video information and/or other information may be obtained. The video information may define a video having a progress length. The video may include video frames. The video frames may include depiction of a person that moves during the progress length of the video. The video frames may include the depiction of the person at different locations within the video frames. The video frames may include a first video frame, a second video frame, and/or other video frames. The first video frame may include the depiction of the person at a first location and the second video frame may include the depiction of the person at a second location different from the first location. In some implementations, operation 201 may be performed by a processor component the same as or similar to the video information component 102 (Shown in FIG. 1 and described herein).

At operation 202, the different locations of the depiction of the person within the video frames may be determined. In some implementations, operation 202 may be performed by a processor component the same as or similar to the location component 104 (Shown in FIG. 1 and described herein).

At operation 203, different portions of the video frames to be included in a composite video may be determined based on the different locations of the depiction of the person within the video frames and/or other information. In some implementations, operation 203 may be performed by a processor component the same as or similar to the portion component 106 (Shown in FIG. 1 and described herein).

At operation 204, a background image may be generated from the video frames based on the different locations of the depiction of the person within the video frames and/or other information. The background image may not include the depiction of the person. In some implementations, operation 204 may be performed by a processor component the same as or similar to the background component 108 (Shown in FIG. 1 and described herein).

At operation 205, the composite video may be generated based on the different portions of the video frames, the background image, and/or other information. The composite video may include composite video frames. The composite video frames may include multiple depictions of the person. In some implementations, operation 205 may be performed by a processor component the same as or similar to the composite component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for generating composite videos, the system comprising:
    one or more physical processors configured by machine-readable instructions to:
        obtain video information defining a video having a progress length, the video including video frames, the video frames including depiction of a person that moves during the progress length of the video, wherein the video frames include the depiction of the person at different locations within the video frames such that the video frames include a first video frame and a second video frame, the first video frame including the depiction of the person at a first location and the second video frame including the depiction of the person at a second location different from the first location;
        determine the different locations of the depiction of the person within the video frames;
        determine different portions of the video frames to be included in a composite video based on the different locations of the depiction of the person within the video frames, wherein determination of the different portions of the video frames to be included in the composite video includes determination of different locations of a mask for the video frames based on the different locations of the depiction of the person within the video frames such that the depiction of the person within the video frames is included within the mask;
        generate a background image from the video frames based on the different locations of the depiction of the person within the video frames, the background image not including the depiction of the person; and
        generate the composite video based on the different portions of the video frames and the background image, the composite video including composite video frames, wherein the composite video frames include multiple depictions of the person.

2. The system of claim 1, wherein the background image is generated based on merging of two or more of the video frames, the two or more of the video frames selected for merging based on the different locations of the depiction of the person within the video frames.

3. The system of claim 1, wherein the different locations of the depiction of the person within the video frames are determined based on body detection.

4. The system of claim 3, wherein the different locations of the depiction of the person within the video frames are determined based on face detection responsive to failure of the body detection.

5. The system of claim 1, wherein the composite video frames include the multiple depictions of the person based on merging of multiple ones of the depiction of the person included within multiple ones of the video frames and included within the mask into individual composite video frames.

6. The system of claim 5, wherein determination of the different locations of the mask includes determination of different placements and/or different sizes of the mask.

7. The system of claim 6, wherein the different placements and/or the different sizes of the mask are determined to prevent overlap of the mask for the merging of the multiple ones of the depiction of the person included within the multiple ones of the video frames and included within the mask into the individual composite video frames.

8. The system of claim 7, wherein the multiple ones of the video frames are selected for the merging of the multiple ones of the depiction of the person included within the multiple ones of the video frames and included within the mask into the individual composite video frames based on matching of audio associated with the video frames.

9. The system of claim 7, wherein the multiple ones of the video frames are selected for the merging of the multiple ones of the depiction of the person included within the multiple ones of the video frames and included within the mask into the individual composite video frames based on matching of poses of the person depicted within the video frames.

10. A method for generating composite videos, the method performed by a computing system including one or more processors, the method comprising:
    obtaining, by the computing system, video information defining a video having a progress length, the video including video frames, the video frames including depiction of a person that moves during the progress length of the video, wherein the video frames include the depiction of the person at different locations within the video frames such that the video frames include a first video frame and a second video frame, the first video frame including the depiction of the person at a first location and the second video frame including the depiction of the person at a second location different from the first location;
    determining, by the computing system, the different locations of the depiction of the person within the video frames;
    determining, by the computing system, different portions of the video frames to be included in a composite video based on the different locations of the depiction of the person within the video frames, wherein determining the different portions of the video frames to be included in the composite video includes determining different locations of a mask for the video frames based on the different locations of the depiction of the person within the video frames such that the depiction of the person within the video frames is included within the mask;
    generating, by the computing system, a background image from the video frames based on the different locations of the depiction of the person within the video frames, the background image not including the depiction of the person; and
    generating, by the computing system, the composite video based on the different portions of the video frames and the background image, the composite video including composite video frames, wherein the composite video frames include multiple depictions of the person.

11. The method of claim 10, wherein the background image is generated based on merging of two or more of the video frames, the two or more of the video frames selected for merging based on the different locations of the depiction of the person within the video frames.

12. The method of claim 10, wherein the different locations of the depiction of the person within the video frames are determined based on body detection.

13. The method of claim 12, wherein the different locations of the depiction of the person within the video frames are determined based on face detection responsive to failure of the body detection.

14. The method of claim 10, wherein the composite video frames include the multiple depictions of the person based on merging of multiple ones of the depiction of the person included within multiple ones of the video frames and included within the mask into individual composite video frames.

15. The method of claim 14, wherein determining the different locations of the mask includes determining different placements and/or different sizes of the mask.

16. The system of claim 14, wherein the different placements and/or the different sizes of the mask are determined to prevent overlap of the mask for the merging of the multiple ones of the depiction of the person included within the multiple ones of the video frames and included within the mask into the individual composite video frames.

17. The system of claim 16, wherein the multiple ones of the video frames are selected for the merging of the multiple ones of the depiction of the person included within the multiple ones of the video frames and included within the mask into the individual composite video frames based on matching of audio associated with the video frames.

18. The system of claim 16, wherein the multiple ones of the video frames are selected for the merging of the multiple ones of the depiction of the person included within the multiple ones of the video frames and included within the mask into the individual composite video frames based on matching of poses of the person depicted within the video frames.

19. A system for generating composite videos, the system comprising:
    one or more physical processors configured by machine-readable instructions to:
        obtain video information defining a video having a progress length, the video including video frames, the video frames including depiction of a person that moves during the progress length of the video, wherein the video frames include the depiction of the person at different locations within the video frames such that the video frames include a first video frame and a second video frame, the first video frame including the depiction of the person at a first location and the second video frame including the depiction of the person at a second location different from the first location;
        determine the different locations of the depiction of the person within the video frames;

determine different portions of the video frames to be included in a composite video based on the different locations of the depiction of the person within the video frames, wherein determination of the different portions of the video frames to be included in the composite video includes determination of different locations of a mask for the video frames based on the different locations of the depiction of the person within the video frames such that the depiction of the person within the video frames is included within the mask, wherein determination of the different locations of the mask includes determination of different placements and/or different sizes of the mask;

generate a background image from the video frames based on the different locations of the depiction of the person within the video frames, the background image not including the depiction of the person, wherein the background image is generated based on merging of two or more of the video frames, the two or more of the video frames selected for merging based on the different locations of the depiction of the person within the video frames; and generate the composite video based on the different portions of the video frames and the background image, the composite video including composite video frames, wherein the composite video frames include multiple depictions of the person.

20. The system of claim 19, wherein:

the composite video frames include the multiple depictions of the person based on merging of multiple ones of the depiction of the person included within multiple ones of the video frames and included within the mask into individual composite video frames; and the different placements and/or the different sizes of the mask are determined to prevent overlap of the mask for the merging of the multiple ones of the depiction of the person included within the multiple ones of the video frames and included within the mask into the individual composite video frames.

\* \* \* \* \*

UNITED STATES PATENT AND TRADEMARK OFFICE
CERTIFICATE OF CORRECTION

PATENT NO. : 11,404,088 B1
APPLICATION NO. : 17/244895
DATED : August 2, 2022
INVENTOR(S) : Oules et al.

It is certified that error appears in the above-identified patent and that said Letters Patent is hereby corrected as shown below:

In the Claims

In Claim 16, Column 20, Line 31, please delete "system of claim 14" and insert --method of claim 15--, therefor.

In Claim 17, Column 20, Line 37, please delete "system" and insert --method--, therefor.

In Claim 18, Column 20, Line 43, please delete "system" and insert --method--, therefor.

Signed and Sealed this
Twenty-fifth Day of October, 2022

Katherine Kelly Vidal
*Director of the United States Patent and Trademark Office*